(12) United States Patent
Ballarin

(10) Patent No.: US 10,851,872 B2
(45) Date of Patent: Dec. 1, 2020

(54) ROPE END SAFETY DEVICE

(71) Applicant: Daniel Ballarin, Brisbane, CA (US)

(72) Inventor: Daniel Ballarin, Brisbane, CA (US)

( * ) Notice: Subject to any disclaimer, the term of this patent is extended or adjusted under 35 U.S.C. 154(b) by 0 days.

(21) Appl. No.: 15/969,996

(22) Filed: May 3, 2018

(65) Prior Publication Data
US 2019/0338829 A1 Nov. 7, 2019

(51) Int. Cl.
*F16G 11/04* (2006.01)
*F16B 45/02* (2006.01)
*F16B 2/18* (2006.01)
*F16G 11/10* (2006.01)

(52) U.S. Cl.
CPC ............ *F16G 11/048* (2013.01); *F16B 2/18* (2013.01); *F16B 45/02* (2013.01); *F16G 11/106* (2013.01)

(58) Field of Classification Search
CPC ........ F16G 11/048; F16G 11/106; F16B 2/18; F16B 45/02
See application file for complete search history.

(56) References Cited

U.S. PATENT DOCUMENTS

| | | | | |
|---|---|---|---|---|
| 3,852,943 | A * | 12/1974 | Healy | A62B 1/14 24/134 R |
| 4,253,218 | A * | 3/1981 | Gibbs | A62B 1/14 182/5 |
| 4,716,630 | A * | 1/1988 | Skyba | F16G 11/106 24/134 KB |
| 5,146,655 | A * | 9/1992 | Gibbs | A44B 99/00 188/65.2 |
| 5,638,919 | A * | 6/1997 | Pejout | A62B 1/14 182/192 |
| 6,009,977 | A * | 1/2000 | Pelofi | A62B 1/14 182/192 |
| 9,132,297 | B2 * | 9/2015 | Casebolt | A62B 1/14 |
| 9,415,245 | B2 * | 8/2016 | Codega | A63B 29/02 |
| 9,482,251 | B2 * | 11/2016 | Moine | F16B 2/06 |
| 2010/0126802 | A1 * | 5/2010 | Delaittre | A62B 1/14 182/133 |

* cited by examiner

*Primary Examiner* — Robert Sandy
*Assistant Examiner* — David M Upchurch

(57) ABSTRACT

A safety apparatus on a rope, comprising a housing for guiding the rope, a clamping mechanism such as a trigger configured to release or clamp the rope against the housing, and a control mechanism, wherein the control mechanism comprises a rope end sensor which is physically displaced by the rope. When rope no longer displaces the rope end sensor, such as when the rope end has passed by the control mechanism, the trigger is biased to an active, clamped position thus halting the rope between the trigger and the housing.

12 Claims, 4 Drawing Sheets

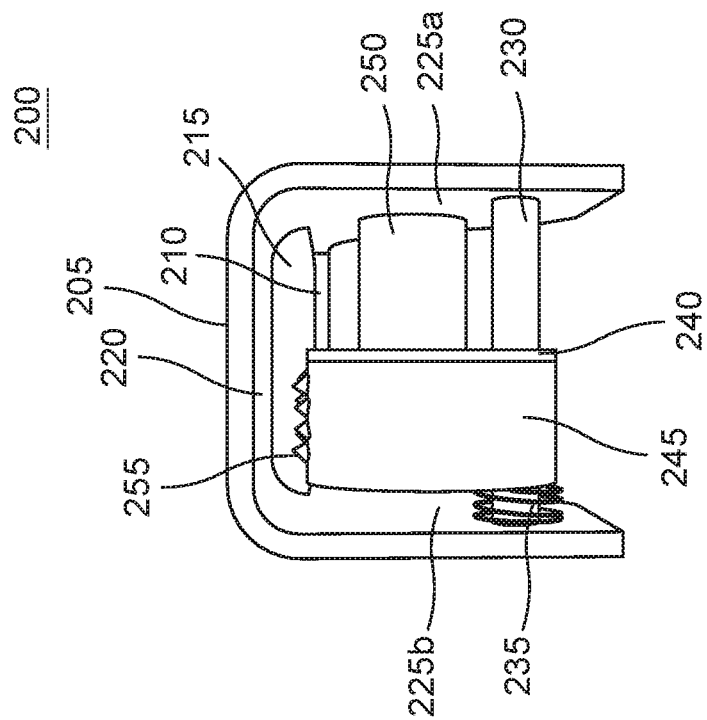
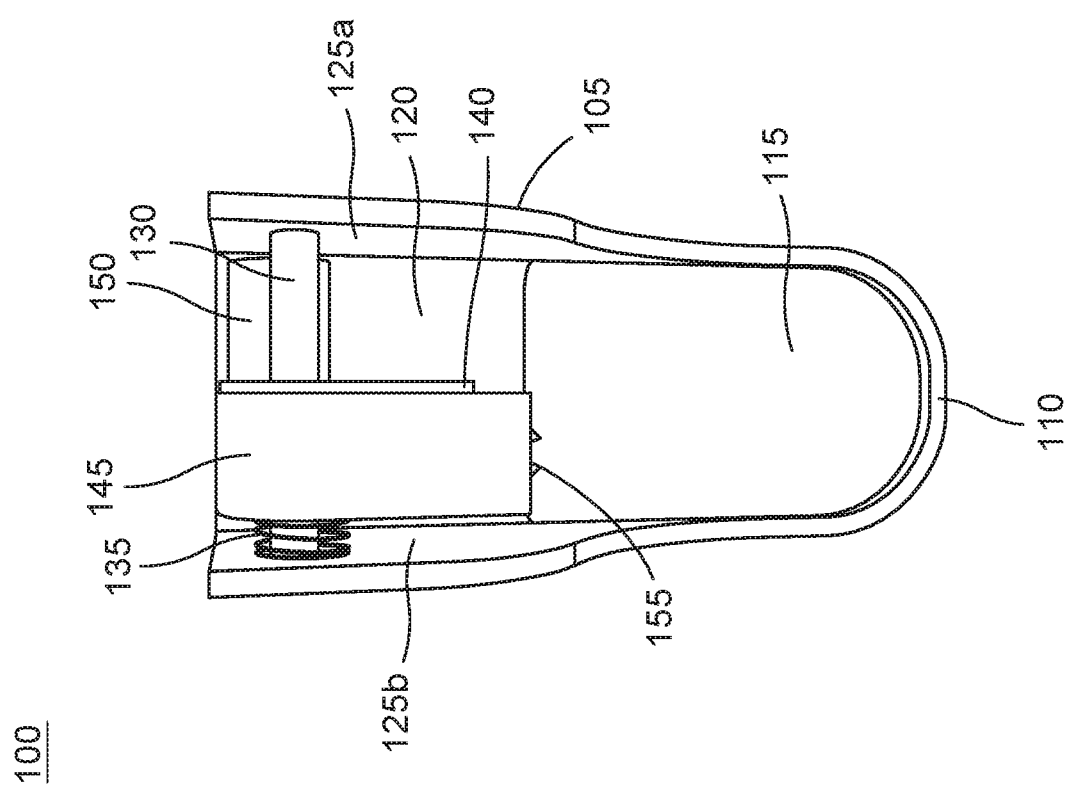
FIG. 1
FIG. 2

ROPE END SAFETY DEVICE

TECHNICAL FIELD

The present invention relates generally to safety devices, and more particularly to safety devices for ropes or rope like structures.

BACKGROUND

Description of the Related Art

The following is a tabulation of prior art that appears relevant:

U.S. Patents

| U.S. Pat. No. | Kind Code | Issue Date | Patentee |
| --- | --- | --- | --- |
| 8,191,347 | B2 | 2012 Jun. 5 | Nagode |

Nonpatent Literature Documents

Williamson, J. Accidents in North American Mountaineering. 2013 No. 3, Issue 66. (review accessible online at: https://www.climbing.com/news/know-the-ropes-prevent-lowering-accidents/)

Safety equipment involving the use of rope is widely utilized for outdoor activities, from rock climbing, mountaineering, and rappelling, to professional first responders, firefighters, and the military. For roped activities, persons use safety equipment such as harnesses, carabiners, and other gear to reduce the likelihood of significant injury or fatality.

Belay devices are mechanical devices, implemented in different ways, which utilize the principle of increasing rope friction to slow or stop movement of a rope, and thereby slow or stop the person attached to the rope. Prior to belay devices, even until the 1970s, many climbers relied simply on wrapping the rope around their bodies to increase rope friction, referred to as a "hip belay."

Many different types of belay devices have been developed. Exemplary belay devices include tubular belay devices, assisted braking belay devices, and FIG. 8 belay devices. Each of these belay devices are implemented in different ways, but all rely on the principle of creating friction with a rope in order to slow or stop the rope. Belay devices are limited in that they require a rope to be present to function. If the rope's end passes through the belay device, there is no contact between the device and the rope, and thus no ability to create friction or stop the rope. Once one rope end has passed through the belay device, which can be referred to as a "rope-out" condition, the rope and the person attached to the other rope end will enter free fall.

Currently, there have been many deaths and serious injuries related to persons rappelling off the end of a rope or lowering another person with an inadequate length of rope (Williamson, 2013). There is no device available, as part of a belay device or as an independent device, to stop a rope once it has passed through a belay device.

Conventional solutions to prevent a rope-out condition have included tying a knot at a rope end, referred to as a "stopper-knot," which intends to prevent the rope end from pulling through a belay device. Because the stopper-knot is wider than the opening in the belay device, the knot may prevent the rope end from pulling through the belay device. There are many circumstances, however, where this is not a reliable solution. First, stopper-knots rely on human memory to implement on a rope at appropriate times, and thus may easily be forgotten or overlooked, especially under conditions of fatigue. In another example, a knot in the rope may actually increase danger, for instance if the knot becomes caught in natural terrain, thus preventing movement or use of the rope, leading to a hazardous situation for a climber. Finally, depending on the force of a falling person, a stopper-knot may actually be pulled through a belay device if the rope is adequately compressible. In examples where a stopper-knot in a rope may be inadvisable or inappropriate based on the conditions, there is no substantial safety device available to prevent a rope-out condition.

Another proposed safety measure is by attaching a metal clamp to a rope end to identify the rope end location—for example, U.S. Pat. No. 8,191,347 (2012). A major limitation being that the metal clamp is primarily designed to mark the rope end, not prevent the rope end from passing through a belay device, also called a rope-out condition. Even when a metal clamp may prevent a rope-out condition, the force generated when the clamp impacts the belay device could seriously damage the belay device. Another limitation being that the metal clamp may act as a source of injury to a climber or bystander. In one example, when a rope end with an attached metal clamp is being pulled from a substantial height, the clamped rope end bears extra weight, and may fall and swing with significant force to potentially impact with a person below. Metal clamps are also limited by the need for extra equipment for attachment to a rope end before climbing and for removal from the rope end after climbing.

Accordingly, conventional solutions for preventing rope-out conditions are generally inadequate to prevent a person from lowering or rappelling past a rope end.

SUMMARY

Some embodiments of the invention provide, for example, a safety apparatus for use with a rope or rope like structure, wherein it is desired to stop the rope before a rope end passes through a device.

Advantages

Some embodiments have the advantage, among other advantages, of being built in a device or a belay device, which can greatly decrease the risk of accident, such as might otherwise be caused by, for example, forgetting to utilize other techniques such as stopper-knots or other rope-attached or rope-altering techniques. Other advantages of one or more aspects will be apparent from a consideration of the drawings and ensuing description.

DRAWINGS—REFERENCE NUMERALS

100, 200, 300, 300', 301', 400, 500 Rope end safety device, or device
105, 205, 305, 305', 405, 505 Housing
306' Housing side wall
110, 210, 310, 410, 510 Safety loop
115, 215, 315, 415, 515 Opening
120, 220, 320, 420, 520 Blocking face
125a, 225a, 325a, 425a, 525a Parallel face
125b, 225b, 325b, 425b, 525b Parallel face
130, 230, 330, 330', 430, 530 Spindle 135, 235, 335, 335', 435, 535 Spring
140, 240, 340, 440, 540 Plate
340' Lever bar
145, 245, 345, 345', 445, 545 Clamping mechanism such as a trigger
150, 250, 350, 350', 450, 550 Rope end sensor
155, 255, 455, 555 Rope stops
355 Secondary spindle
360b Aperture (for secondary spindle)
360a, 365a, 365b Apertures (for spindle)
460, 560 Rope
465, 565 Rope end
470, 570 Carabiner

BRIEF DESCRIPTION OF THE DRAWINGS

The accompanying drawings illustrate an embodiment of a rope end safety device.

FIG. 1 illustrates a front view of a rope end safety device.

FIG. 2 illustrates a top view of a rope end safety device.

DETAILED DESCRIPTION OF FIRST EMBODIMENT

Figure 3:
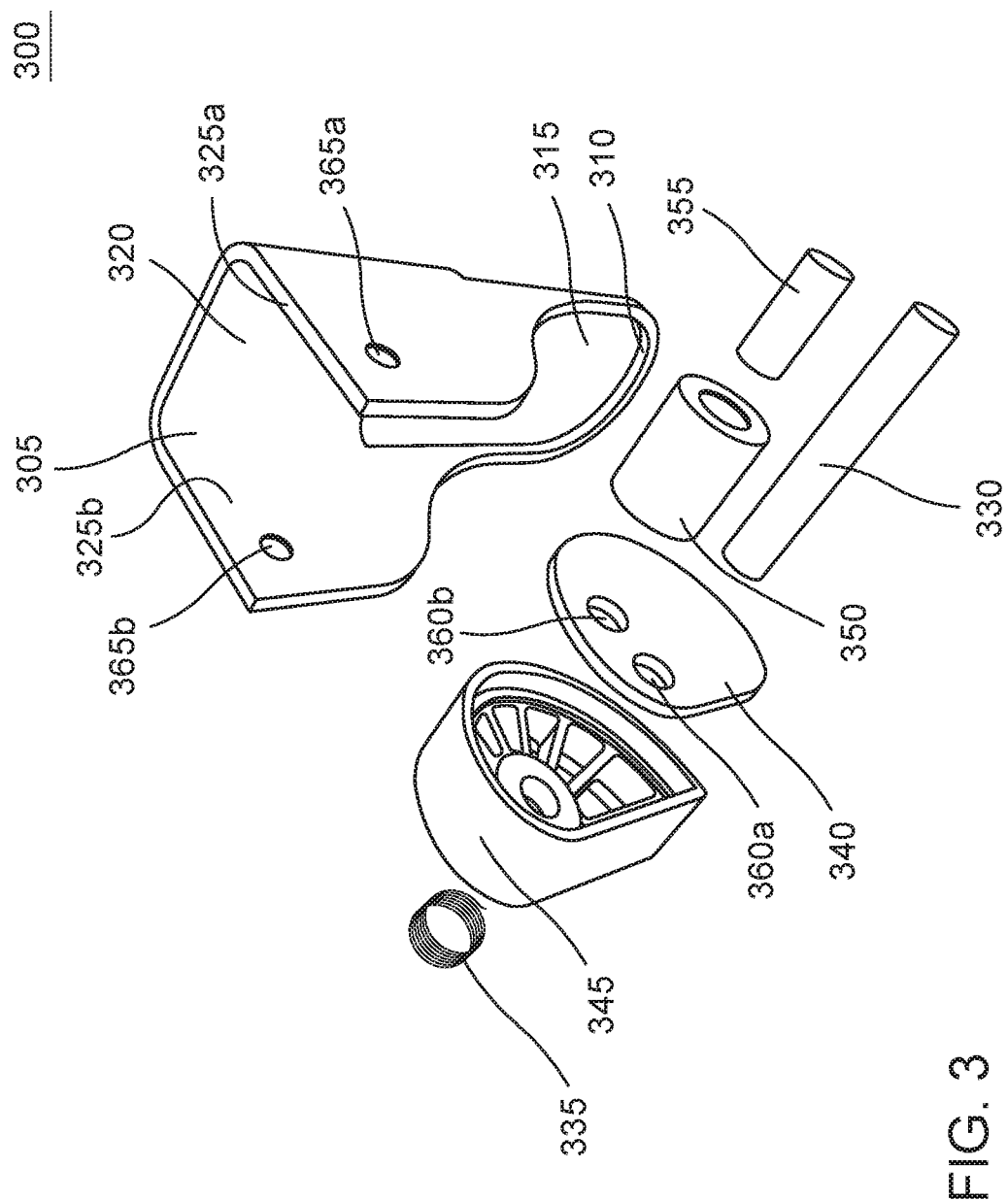
FIG. 3 illustrates an exploded view of a rope end safety device.

Other advantages and features will become apparent from the following description of an embodiment of the invention given for non-restrictive example purposes only. Some embodiments of the invention are described with respect to the drawings. However, embodiments described herein are intended to be illustrative, and the invention contemplates other embodiments within the scope of the invention. Those skilled in the art will appreciate that the techniques and embodiments may also be practiced in other similar apparatus. Furthermore, embodiments of the invention include apparatus as well as systems and methods.

Some embodiments relate to devices, such as belay devices, or to apparatus that can be used with devices such as belay devices. Other embodiments can be used as part of, or with devices such as grigris, other belay devices, non-belay devices, rappelling devices, descent devices, controlled descent devices, and others.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure may be alternatively included in another embodiment or figure regardless of whether or not those elements are shown or described in another embodiment or figure. In other words, elements in the figures may be interchangeable between various embodiments disclosed herein, whether shown or not.

According to some embodiments with reference to FIG. 1 is a front view of a rope end safety device 100, which shall be referred to simply as device 100. Device 100 may be implemented as a part of a belay device or as a secondary device independent of a belay device.

Device 100 includes a housing 105 which is typically composed of a rigid metal or metal alloy (such as aluminum, steel, titanium, or other similar lightweight and strong metals/metal alloys), although certain plastics or carbon fiber materials may also be suitable construction materials. Housing 105 includes a safety loop 110, typically composed of similar materials with respect to housing 105, or different materials such as cable, nylon, polyester, or dyneema. Safety loop 110 outlines an opening 115, which allows device 100 to be connected to a carabiner or other anchoring force. Housing 105 further includes a blocking face 120, which connects parallel faces 125a and 125b. Parallel faces 125a and 125b extend perpendicularly up from blocking face 120. Parallel faces 125a and 125b are shown in FIG. 1 as being parallel to each other. However, the term "parallel" faces should not be considered limiting in that parallel faces are not required to be parallel. For example, parallel faces 125a and 125b may not be precisely perpendicular to blocking face 120. Parallel faces 125a and 125b may be within a range of +/−45° of perpendicular to blocking face 120, therefore in some implementations flaring towards each other or away from each other.

Parallel faces 125a and 125b each include parallel apertures to accommodate the installation of spindle 130 between the parallel apertures. Spindle 130 may rotate around an axis, and may be disposed through a spring 135. Spindle 130 may also be disposed through an aperture in plate 140. Plate 140 may further be attached to a clamping mechanism such as trigger 145 or may be an integral component of trigger 145. In this manner, spindle 130 extends between apertures in parallel faces 125a and 125b and through apertures in plate 140 and trigger 145.

Plate 140 may include two apertures. A first aperture may accommodate spindle 130. A second aperture may accommodate a rope end sensor 150, such as a cylinder which displaces a rope, which may therefore be spring loaded to press the rope against blocking face 120, as will be discussed below in the paragraph beginning, "Operation of devices 400 and 500."

Trigger 145 may be typically implemented in a general pear cam shape, although many alternative shapes and configurations are possible. In one embodiment, trigger 145 may include a plurality of rope stops 155 such as directioned small spikes, serrations, or hooks. Rope stops 155 may enhance friction between a rope and blocking face 120.

According to some embodiments with reference to FIG. 2 is a top view of a rope end safety device 200, or device 200. Device 200 includes a housing 205 which is similar in implementation and description to housing 105 shown in FIG. 1, and a safety loop 210 which is similar to safety loop 110 shown in FIG. 1. Safety loop 210 outlines an opening 215 which allows device 200 to be connected to a carabiner or other anchoring force. Housing 205 further includes a blocking face 220, which is similar in implementation and description to blocking face 120, shown in FIG. 1, and which connects parallel faces 225a and 225b which extend perpendicularly up from blocking face 220.

Parallel faces 225a and 225b each include parallel apertures to accommodate the installation of spindle 230 between the parallel apertures. Spindle 230 may rotate around an axis, and may be disposed through a spring 235. Spindle 230 may also be disposed through an aperture in plate 240. Plate 240 may further be attached to trigger 245. In this manner, spindle 230 extends between apertures in parallel faces 225a and 225b and through apertures in plate 240 and trigger 245.

Plate 240 may include two apertures. A first aperture may accommodate spindle 230, while a second aperture may accommodate a rope end sensor 250, such as a cylinder which displaces a rope. Rope end sensor 250 may therefore be spring loaded to press a rope against blocking face 220, as will be discussed below in the paragraph beginning, "Operation of devices 400 and 500."

Trigger 245 may be implemented in a general pear cam shape. In one embodiment, trigger 245 may include a plurality of rope stops 255 such as directioned small spikes, serrations, or hooks. Rope stops 255 may enhance friction between a rope and blocking face 220.

According to some embodiments with reference to FIG. 3 is an exploded view of a rope end safety device 300, or device 300. Device 300 includes a housing 305 which is similar in implementation and description to housing 105 shown and described in FIG. 1. Housing 305 further includes safety loop 310 and opening 315 which are also similar in implementation and description to safety loop 110 and opening 115 shown and described in FIG. 1. Housing 305 further includes a blocking face 320 which is similar in implementation and description to blocking face 120, shown in FIG. 1, and which connects parallel faces 325a and 325b which extend perpendicularly up from blocking face 320.

Parallel faces 325a and 325b include parallel apertures 365a and 365b, respectively, to accommodate the installation of spindle 330. Spindle 330 may also be disposed through an aperture 360a in plate 340, trigger 345, and a spring 335. Plate 340 may be further attached to trigger 345. In this manner, spindle 330 extends between aperture 365a in parallel face 325a, through aperture 360a in plate 340, trigger 345, and spring 335 into aperture 365b in parallel face 325b.

Plate 340 includes a second aperture 360b to accommodate a rope end sensor 350. Rope end sensor 350 may be configured as a cylinder which displaces a rope and attaches to plate 340 via a secondary spindle 355 disposed through rope end sensor 350 and into aperture 360b of plate 340. Thus, rope end sensor 350 may be guided between plate 340 and parallel face 325a to rotate towards blocking face 320 under the load provided by spring 335. Rope end sensor 350 may also be guided between plate 340 and parallel face 325a to rotate away from blocking face 320 when a rope is installed between rope end sensor 350 and blocking face 320. Further, rope end sensor 350 may also rotate around the secondary spindle 355 to reduce friction as a rope passes by rope end sensor 350. Rope end sensor 350 may further include an annular groove, grooves, or raised edges (e.g., may be V shaped or may be contained by edges) that tend to maintain contact and guide a rope along rope end sensor 350.

Trigger 345, plate 340, spindle 330, rope end sensor 350, and secondary spindle 355 may be constructed using a variety of materials including metals, metal alloys, plastics, and carbon fiber materials. Examples of metals include iron, aluminum, or titanium while examples of metal alloys include steel or other alloys. Plastics may include polyethylene plastics (PET, PETE, HDPE, LDPE), polyvinyl chloride (PVC), polypropylene, polystyrene, polyoxymethylene, or any other suitable plastic material. Spring 335 may be fashioned from a material such as spring steel.

Rope end sensor 350 may therefore be spring loaded by virtue of its attachment to plate 340, trigger 345, and spring 335. Spring 335 may include spring legs that attach to parallel face 325b and trigger 345, which allow spring pressure that pushes trigger 345 towards blocking face 320. As plate 340, trigger 345, spindle 330, rope end sensor 350, and secondary spindle 355 all rotate around the axis of spindle 330 as a single unit, spring 335 also allows spring pressure that pushes rope end sensor 350 towards blocking face 320. In this manner, constant spring pressure forces trigger 345 and rope end sensor 350 towards blocking face 320.

Figure 4:
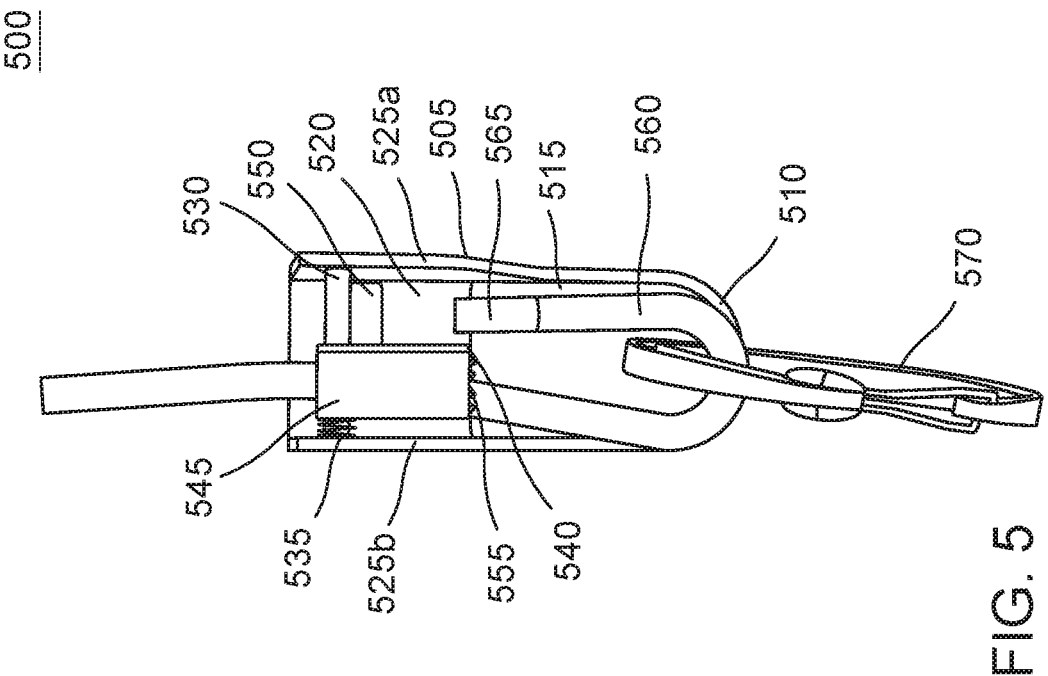
FIG. 4 illustrates a front view of a rope end safety device under an inactive, unclamped rope condition.

According to some embodiments with reference to FIG. 4 is a front view of a rope end safety device 400, or device 400, under an inactive, unclamped rope condition. Device 400 is implemented in a similar fashion to device 100 as described and shown above in FIG. 1. Device 400 includes a housing 405, a safety loop 410, an opening 415 outlined by safety loop 410, a blocking face 420, parallel faces 425a and 425b, spindle 430, spring 435, plate 440, trigger 445, rope end sensor 450, and rope stops 455, as shown and described above with corresponding elements shown in FIGS. 1-3.

Figure 5:
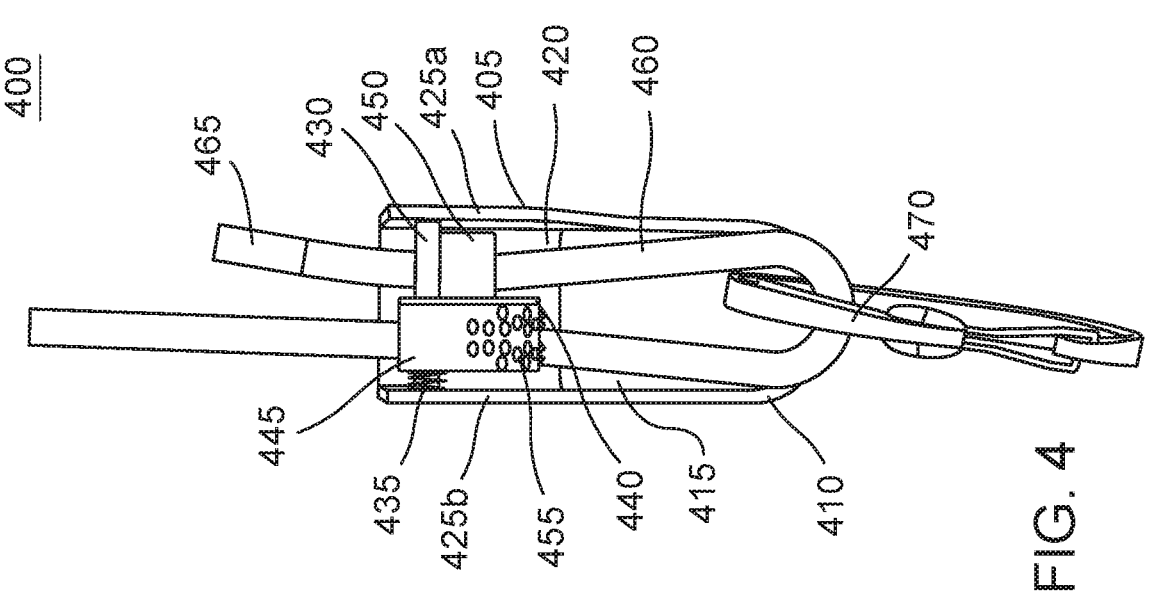
FIG. 5 illustrates a front view of a rope end safety device under an active, clamped rope condition.

According to some embodiments with reference to FIG. 5 is a front view of a rope end safety device 500, or device 500, under an active, clamped rope condition. Device 500 is implemented in a similar fashion to device 100 as described and shown above in FIG. 1. Device 500 includes a housing 505, a safety loop 510, an opening 515 outlined by safety loop 510, a blocking face 520, parallel faces 525a and 525b, spindle 530, spring 535, plate 540, trigger 545, rope end sensor 550, and rope stops 555, as shown and described above with corresponding elements in FIGS. 1-4.

Operation of devices 400 and 500, with reference to FIGS. 4 and 5, is as follows: A rope 460 is disposed as a loop within device 400. Rope 460 is freely movable within device 400, and traveling in a direction such that rope end 465 approaches rope end sensor 450. A carabiner 470 attaches to safety loop 410 and a belayer's climbing harness (not shown) or other anchoring force. The loop in rope 460 is disposed through device 400, through carabiner 470, and back to device 400, thus creating a U-shaped form.

In FIG. 4, rope 460 is detected by rope end sensor 450 in that rope 460 physically displaces and pushes rope end sensor 450 away from blocking face 420. Spring pressure applied by spring 435 biases rope end sensor 450 towards rope 460 and blocking face 420, as described above. Further, rope end sensor 450 may be cylindrical in shape and allowed to pivot or roll around an internal secondary spindle (not shown), such as secondary spindle 355 shown in FIG. 3, in order to reduce rope friction. Thus, even as rope 460 pushes rope end sensor 450 away from blocking face 420 under spring pressure applied by spring 435, rope 460 may still freely pass through device 400.

In FIG. 5, a rope 560 is disposed as a loop within device 500. As compared to FIG. 4, rope end 565 has passed by rope end sensor 550 in the direction of carabiner 570. Without no rope detected by rope end sensor 550, physical displacement of rope end sensor 550 is lost. Because rope end sensor 550 is biased towards blocking face 520 under spring pressure applied by spring 535, absence of rope 560 causes rope end sensor 550 to rotate around the axis within spindle 530 towards blocking face 520. Because rope end sensor 550 moves as a single unit with plate 540, spindle 530, and trigger 545, rotation of rope end sensor 550 also results in rotation of trigger 545 around the axis within spindle 530 towards blocking face 520. As trigger 545 pivots or rotates, trigger 545 may pinch or clamp rope 560 between trigger 545 and blocking face 520, such that no additional rope may pass through device 500. Rope stops 555 may provide additional friction to stop movement of rope 560.

By trapping, pinching, or clamping rope 560 to blocking face 520, a clamping mechanism such as trigger 545 prevents rope 560 from passing completely through device 500 and may therefore prevent a climber who is attached to the other rope end (unpictured) from falling to severe injury or death. The climber (unpictured) remains attached to rope 560, which is clamped between trigger 545 and blocking face 520. Fall forces are transmitted through housing 505 to safety loop 510. Carabiner 570 transmits forces from safety loop 510 to a belayer's climbing harness (not shown) or other anchoring force.

In this manner, a robust device is provided which detects a rope end 565 and clamps a rope 560 so as to prevent a rope-out condition, which may cause a climber to fall to severe injury or death. Device 500 detects that a rope end 565 has passed by rope end sensor 550 and, in response, causes trigger 545 to pivot and trap, pinch, or clamp rope 560 between a clamping mechanism such as trigger 545 and blocking face 520 of housing 505. This connection, while not intended to be permanent, may be sufficient to prevent a climber from falling during a lowering operation. Further, device 500 may add a measure of safety that is reliable, intuitive, easy to use, and efficient while not adding significant overall cost to a device or belay device.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Alternative Embodiments

Figure 7:
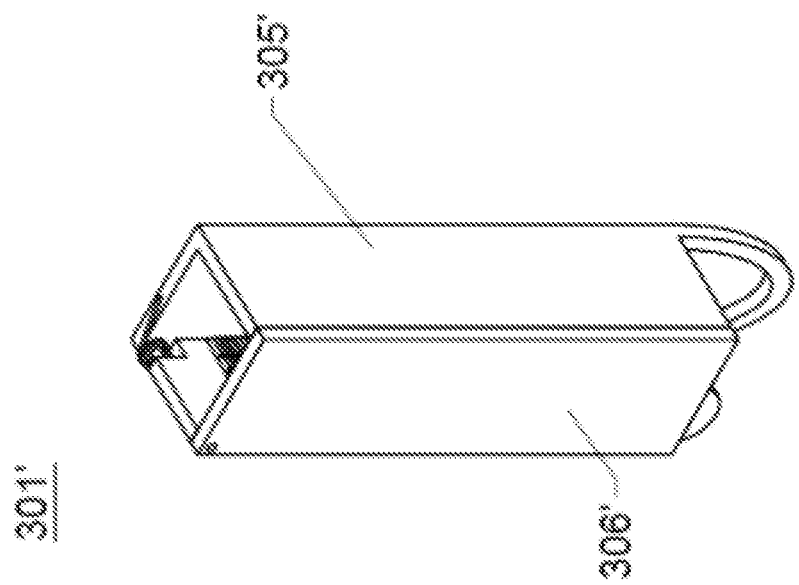
FIG. 7 illustrates an alternative embodiment of a rope end safety device with all walls present.
Figure 6:
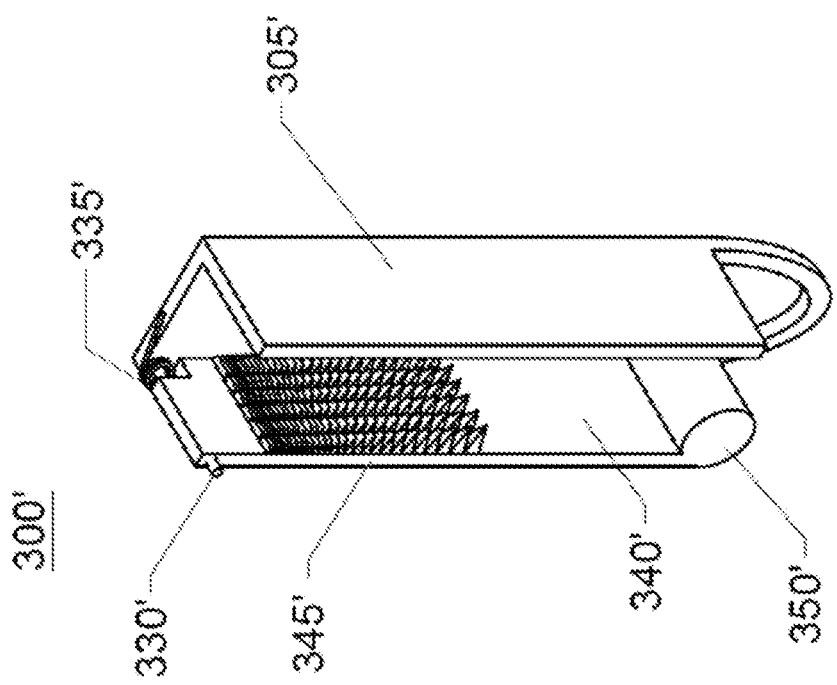
FIG. 6 illustrates an alternative embodiment of a rope end safety device with one wall removed for illustrative purposes.

According to an alternative embodiment 300' with reference to FIG. 6 is a front view of a rope end safety device with one wall removed for visualization purposes. According to an alternative embodiment 301' with reference to FIG. 7 is a front view of a rope end safety device with all walls present. Housing side wall 306' present in FIG. 7 has been removed in FIG. 6 to allow for illustration of inner componentry.

Alternative housing 305' may be constructed in a variety of forms, including a cylindrical, square, or other tubular shape which can be implemented around a rope. Also, rope end sensor 350' and trigger 345' may be arranged either side by side along the axis of spindle 330', or configured in a vertical arrangement and instead connected by a lever bar 340' as shown in FIG. 7. This lever bar would function similarly to plate 340 shown in FIG. 3, which connects rope end sensor 350 to trigger 345. In device 300', lever bar 340' may be constructed from any of various metals, metal alloys, plastic, or carbon fiber materials. In this embodiment, lever bar 340' is attached at one end to rope end sensor 350', and extends approximately several centimeters to join with a spindle 330' at the other end. Spindle 330' may be attached between two parallel apertures 365a' and 365b', similar to apertures 365a and 365b in FIG. 3, within a side wall of housing 305'. Thus trigger 345', lever bar 340', and rope end sensor 350' move as a single unit and rotate around the axis of spindle 330'. A spring 335', similar to spring 335 in FIG. 3, biases spindle 330' and attached components towards housing 305'. Trigger 345' may include a plurality of rope stops such as directioned small spikes, serrations, or hooks to increase rope friction.

Operation of alternative embodiment 300' is as follows: A rope may be disposed through the open ends of tubular housing 305'. In contrast to the rope maintaining a U-shaped form as seen in FIG. 4 above, the rope (not shown) in FIG. 6 maintains a linear form. A rope end (not shown) passes in the direction from rope end sensor 350' towards spindle 330'. Initially, the rope is detected by rope end sensor 350' in that the rope physically displaces and pushes rope end sensor 350' away from housing 305'. Rope end sensor 350', lever bar 340', trigger 345', and spindle 330' move as single unit around the axis of spindle 330'. Thus, spring pressure applied by spring 335' biases these components towards the rope and housing 305'. The rope is able to freely pass through the device making contact only with rope end sensor 350'.

When the rope end passes by rope end sensor 350', physical displacement of rope end sensor 350' is lost. Because rope end sensor 350' is biased towards housing 305' under spring pressure applied by spring 335', absence of the rope causes rope end sensor 350' to rotate towards housing 305', thus pivoting lever bar 340', spindle 330', and trigger 345' towards housing 305'. As trigger 345' pivots, trigger 345' may pinch or clamp the rope between trigger 345' and housing 305' such that no additional rope may pass through device 300'.

There are various alternative configurations for a trigger, such as trigger 345', which can also be constructed as a four bar linkage (not shown), the simplest moveable closed chain linkage. In this manner, a four bar linkage may still pivot along a spindle or spindles similarly to trigger 345', and include a friction surface with rope stops. A four bar linkage maintains the advantage of potentially folding relatively flatly and compactly.

There are various alternative configurations for a rope end sensor, such as rope end sensor 350', which may be constructed as a bushing, a bearing, or other rotating configuration in order to reduce friction with a rope as the rope slides past the rope end sensor.

An alternative embodiment (not shown) incorporates two devices such as those shown in FIG. 1, arranged and fastened back to back such that two independent sections of rope may pass through, one section through each side of the device. Thus each rope section is disposed in a U-shaped form, as might be used in a rappelling type situation.

An alternative embodiment (not shown) may include the use of a first magnet incorporated within an end region of the rope itself. A second magnet incorporated within a rope end sensor may be actuated by the first magnet (within the rope) passing by the second magnet, such that attraction or repulsion of the magnets causes the rope end sensor to pivot, thus enabling movement of a trigger to clamp the rope.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

In some embodiments, the invention as claimed includes:

1. A safety apparatus for preventing a rope's end region from passing completely through, the safety apparatus comprising:
   a) a housing configured to guide the rope;
   b) a clamping mechanism configured between an inactive position and an active position, wherein in the inactive position the clamping mechanism does not clamp the rope against the housing, and wherein in the active position the clamping mechanism clamps the rope against the housing;

c) a control mechanism comprising a rope end sensor configured to both keep the clamping mechanism in the inactive position when physically displaced by the rope, and actuate the clamping mechanism into the active position.

2. The safety apparatus according to claim 1, wherein said rope end sensor is configured to actuate the clamping mechanism movement to the active position by passing the rope's end region by the rope end sensor.

3. The safety apparatus according to claim 1, wherein the clamping mechanism comprises a trigger.

4. The safety apparatus according to claim 1, wherein the rope end sensor pivots around a spindle and is biased to the active position by a spring.

5. A safety apparatus for preventing a rope's end region from passing completely through a belay device, the belay device including a housing for guiding the rope, the apparatus including:

a) a clamping mechanism configured between an inactive position and an active position, wherein in the inactive position the clamping mechanism does not clamp the rope against the housing, and wherein in the active position the clamping mechanism clamps the rope against the housing;

b) a control mechanism comprising a rope end sensor configured to both keep the clamping mechanism in the inactive position when physically displaced by the rope, and actuate the clamping mechanism into the active position.

6. The safety apparatus according to claim 5, wherein said rope end sensor is configured to actuate the clamping mechanism movement to the active position by passing the rope's end region by the rope end sensor.

7. The safety apparatus according to claim 5, wherein the clamping mechanism comprises a trigger.

8. The safety apparatus according to claim 5, wherein the rope end sensor pivots around a spindle and is biased to the active position by a spring.

9. A method for preventing a rope's end region from passing completely through a device, comprising:

a) providing a housing configured to guide the rope, providing a clamping mechanism configured between an inactive position and an active position, wherein in the inactive position the clamping mechanism does not clamp the rope against the housing, and wherein in the active position the clamping mechanism clamps the rope against the housing, providing a control mechanism comprising a rope end sensor configured to both keep the clamping mechanism in the inactive position when physically displaced by the rope, and actuate the clamping mechanism into the active position;

b) holding the clamping mechanism in the inactive position which allows movement of the rope;

c) actuating the control mechanism which enables movement of the clamping mechanism into the active position;

wherein the control mechanism will further activate the clamping mechanism to move into the active position and clamp the rope towards the housing, thus halting the rope.

10. The method of claim 9 wherein the control mechanism is actuated by detecting the rope's end region.

11. The method of claim 9 wherein actuating the clamping mechanism prevents the rope's end region from passing completely through the device.

12. The method of claim 11 wherein the control mechanism is actuated by detecting a rope's end region.

* * * * *